United States Patent
Suponitsky et al.

(10) Patent No.: US 9,267,515 B2
(45) Date of Patent: Feb. 23, 2016

(54) JET CONTROL DEVICES AND METHODS

(71) Applicant: General Fusion, Inc., Burnaby (CA)

(72) Inventors: Victoria Suponitsky, Coquitlam (CA); Sandra Justine Barsky, Vancouver (CA); J. Michel G. Laberge, West Vancouver (CA); Douglas Harvey Richardson, Anmore (CA); Peter Leszek Kostka, Vancouver (CA)

(73) Assignee: General Fusion Inc., Burnaby (CA)

( * ) Notice: Subject to any disclaimer, the term of this patent is extended or adjusted under 35 U.S.C. 154(b) by 0 days.

(21) Appl. No.: 14/385,898

(22) PCT Filed: Apr. 4, 2013

(86) PCT No.: PCT/CA2013/050272
§ 371 (c)(1),
(2) Date: Sep. 17, 2014

(87) PCT Pub. No.: WO2013/149345
PCT Pub. Date: Oct. 10, 2013

(65) Prior Publication Data
US 2015/0034164 A1   Feb. 5, 2015

Related U.S. Application Data

(60) Provisional application No. 61/620,326, filed on Apr. 4, 2012.

(51) Int. Cl.
*H01J 13/28* (2006.01)
*F15D 1/00* (2006.01)
(Continued)

(52) U.S. Cl.
CPC ............... *F15D 1/0005* (2013.01); *F15D 1/08* (2013.01); *F17D 1/00* (2013.01); *Y10T 137/0318* (2015.04); *Y10T 137/86163* (2015.04)

(58) Field of Classification Search
USPC .............................................................. 137/1
See application file for complete search history.

(56) References Cited

U.S. PATENT DOCUMENTS 3,181,546 A   5/1965   Boothe
3,248,043 A   4/1966   Taplin et al.
(Continued)

FOREIGN PATENT DOCUMENTS

CA   2767904 A1   2/2011
CA   2750441      4/2012
(Continued)

OTHER PUBLICATIONS

M. Delage et al., "Progress Towards Acoustic Magnetized Target Fusion: An Overview of the R&D Program at General Fusion", 33rd Ann. Conf. Can. Nuc. Soc., Jun. 2012, in 13 pages.
(Continued)

*Primary Examiner* — Tung X Le
*Assistant Examiner* — Srinivas Sathiraju
(74) *Attorney, Agent, or Firm* — Knobbe, Martens, Olson & Bear, LLP

(57) ABSTRACT

Examples of a jet control device are described. The jet control device can comprise a jet deflecting member that is configured to intercept and/or collide with a high speed jet emerging from a jet formation location. The interaction of the jet deflecting member and the jet can cause the high speed jet to be dispersed into a plurality of jets with a number of flow directions which may be sideways to an initial direction of the high speed jet. In one embodiment the deflecting member can include a liquid guide formed by injecting a fluid out of an outlet nozzle so that the liquid guide extends longitudinally away from the outlet nozzle. In another embodiment the deflecting member can include an array of solid pellets injected through an outlet in a direction of the emerging high speed jet and configured to collide with the emerging jet thereby deflecting its initial direction.

17 Claims, 8 Drawing Sheets

(51) Int. Cl.
*F15D 1/08* (2006.01)
*F17D 1/00* (2006.01)

(56) References Cited

U.S. PATENT DOCUMENTS

| | | | |
|---|---|---|---|
| 3,294,323 A | 12/1966 | Ernst | |
| 3,302,398 A | 2/1967 | Taplin et al. | |
| 3,396,619 A | 8/1968 | Bowles et al. | |
| 3,496,956 A | 2/1970 | Taplin et al. | |
| 3,526,242 A | 9/1970 | Werner | |
| 3,620,238 A | 11/1971 | Kawabata | |
| 3,624,239 A | 11/1971 | Fraas et al. | |
| 3,748,226 A | 7/1973 | Ribe et al. | |
| 4,023,065 A | 5/1977 | Koloc | |
| 4,068,147 A | 1/1978 | Wells | |
| 4,129,772 A | 12/1978 | Navratil et al. | |
| 4,217,171 A | 8/1980 | Schaffer | |
| 4,228,380 A | 10/1980 | Wells | |
| 4,252,605 A | 2/1981 | Schaffer | |
| 4,269,658 A | 5/1981 | Ohkawa | |
| 4,292,126 A | 9/1981 | Ohkawa | |
| 4,292,568 A | 9/1981 | Wells et al. | |
| 4,305,784 A | 12/1981 | Ohkawa | |
| 4,317,068 A * | 2/1982 | Ward | H01T 13/50 123/169 MG |
| 4,328,699 A | 5/1982 | Drzewiecki | |
| 4,435,354 A | 3/1984 | Winterberg | |
| 4,469,137 A | 9/1984 | Cleland | |
| 4,643,854 A | 2/1987 | Kendall, Jr. et al. | |
| 5,015,432 A | 5/1991 | Koloc | |
| 5,041,760 A | 8/1991 | Koloc | |
| 5,060,867 A * | 10/1991 | Luxton | B01F 5/0415 239/428.5 |
| 5,227,239 A | 7/1993 | Upadhye et al. | |
| 5,430,776 A | 7/1995 | Stauffer et al. | |
| 5,769,624 A * | 6/1998 | Luxton | F23D 14/20 431/187 |
| 5,906,316 A * | 5/1999 | Gatzemeyer | B05B 1/3442 137/268 |
| 6,056,204 A | 5/2000 | Glezer | |
| 6,411,666 B1 | 6/2002 | Woolley | |
| 6,418,177 B1 | 7/2002 | Stauffer et al. | |
| 6,818,912 B2 | 11/2004 | Koshele et al. | |
| 6,883,734 B1 | 4/2005 | Horii et al. | |
| 7,161,163 B2 | 1/2007 | Gaebel et al. | |
| 7,619,232 B2 | 11/2009 | Schmidt et al. | |
| 7,839,065 B2 | 11/2010 | Nakamura et al. | |
| 7,881,421 B2 | 2/2011 | Shiraishi | |
| 8,537,958 B2 | 9/2013 | Laberge et al. | |
| 8,887,618 B2 | 11/2014 | McIlwraith et al. | |
| 8,891,719 B2 | 11/2014 | Howard et al. | |
| 2002/0057754 A1 | 5/2002 | Stauffer et al. | |
| 2003/0215046 A1 | 11/2003 | Hornkohl | |
| 2005/0271181 A1 | 12/2005 | Winterberg | |
| 2006/0198483 A1 | 9/2006 | Laberge | |
| 2006/0198486 A1 | 9/2006 | Laberge et al. | |
| 2006/0198487 A1 | 9/2006 | Laberge | |
| 2006/0244386 A1* | 11/2006 | Hooke | A61L 2/0011 315/111.21 |
| 2008/0106206 A1* | 5/2008 | Hooke | A61L 2/0011 315/111.21 |
| 2009/0297404 A1* | 12/2009 | Shannon | H01J 37/32082 422/108 |
| 2010/0079073 A1* | 4/2010 | Hooke | A61L 2/0011 315/111.21 |
| 2010/0163130 A1 | 7/2010 | Laberge et al. | |
| 2010/0237165 A1* | 9/2010 | Krueger | B63H 25/46 239/11 |
| 2011/0026657 A1 | 2/2011 | Laberge et al. | |
| 2011/0026658 A1 | 2/2011 | Howard et al. | |
| 2011/0243292 A1 | 10/2011 | Howard et al. | |
| 2014/0247913 A1 | 9/2014 | Laberge et al. | |

FOREIGN PATENT DOCUMENTS

| | | |
|---|---|---|
| EP | 2460160 B1 | 6/2013 |
| WO | WO 80/00045 | 1/1980 |
| WO | WO 90/13136 | 11/1990 |
| WO | WO 03/096871 | 11/2003 |
| WO | WO 2010/114360 A1 | 10/2010 |
| WO | WO 2011/014577 | 2/2011 |
| WO | WO 2012/113057 A1 | 8/2012 |
| WO | WO 2013/149345 A1 | 10/2013 |

OTHER PUBLICATIONS

T.K. Fowler, "Stability of Spheromaks Compressed by Liquid Walls", Lawrence Livermore National Laboratory, Aug. 17, 1999, in 9 pages.
S. Howard et al., "Development of merged compact toroids for use as a magnetized target fusion plasma", Journal of Fusion Energy, Nov. 11, 2008, vol. 28, No. 2, pp. 156-161, available Jun. 2008.
Michel Laberge, "Acoustic Wave Driven MTF Fusion Reactor," Mar. 2007, in 20 pages.
Michel Laberge, "An Acoustically Driven Magnetized Target Fusion Reactor," Journal of Fusion Energy, vol. 27, Nos. 1-2, Jul. 11, 2007, pp. 65-68.
Michel Laberge, "Evidence of Fusion Products in Acoustically Driven MTF," Mar. 2007, in 41 pages.
Michel Laberge, "Experimental Results for an Acoustic Driver for MTF," Journal of Fusion Energy, Jun. 2009, vol. 28, Nos. 2, pp. 179-182, available Jun. 2008.
D.J. Meeker et al., "A High Efficiency I.C.F. Driver Employing Magnetically Confined Plasma Rings", Lawrence Livermore National Laboratory, Sixth Topical Meeting on the Technology of Fusion Energy, San Francisco, California, Mar. 3-7, 1985, in 8 pages.
R. L. Miller and R. A. Krakowski, "Assessment of the slowly-imploding liner (LINUS) fusion reactor concept", Los Alamos Scientific Laboratory, Oct. 1980, Issue Rept. No. LA-UR-80-3, Los Alamos, NM, USA, in 10 pages.
M.J. Schaffer, "Slow Liner Fusion", General Atomics Report GA-A22689, Aug. 1997, in 6 pages.
Y.C.F. Thio et al., "Magnetized Target Fusion Driven by Plasma Liners", 2002, in 3 pages.
G.A. Wurden, Letter to Dr. Laberge, May 2007, in 1 page.
M. Thrasher et al., "The Bouncing Jet: A Newtonian Liquid Rebounding off a Free Surface", Physical Review E76, 056319, dated Jul. 11, 2007, published Nov. 29, 2007, in 9 pages.
N. M. Schnurr et. al., "An Analytical Investigation of the Impingement of Jets on Curved Deflectors", AIAA Journal, vol. 10, No. 11, Nov. 1972, in 41 pages.
R. S. Shupe et al., "Effect of Wedge-Shaped Deflectors on Flow Fields of Dual-Stream Jets", 13$^{th}$ AIAA/CEAS Aeroacoustics Conference (28$^{th}$ AIAA Aeroacoustics Conference), May 2007, in 18 pages.
M. J. Carletti et al., "Parametric study of jet mixing enhancement by vortex generators, tabs, and deflector plates", ASME San Diego, ASME Pubs.—FED, vol. 237, pp. 303-312, Jan. 1996, in 10 pages.
Samson AG, "Cavitation in Control Valves", Samson Technical Information, Nov. 2003, in 64 pages.
S. Sankaran et al., "Numerical investigation of the flow characteristics of a supersonic jet impinging on an axi-symmetric deflector", ICAS 2002 Congress, Sep. 2002, in 9 pages.
R. G. Garcia, "CFD simulation of flow fields associated with high speed jet impingement on deflectors", Thesis submitted to Faculty of the Virginia Polytechnic Institute and State University, Apr. 6, 2007, in 71 pages.
V. Suponitsky et al., "Richtmyer-Meshkov instability of a liquid-gas interface driven by a cylindrical imploding wave", Computers & Fluids, vol. 89, Jan. 20, 2014, in 19 pages.
V. Suponitsky et al., "An Overview of Computational Results at General Fusion Inc. with Focus on Hydrodynamics", Proceedings of CFD Society of Canada Conference, May 2012, in 9 pages.
V. Suponitsky et al., "On the Collapse of a Gas Cavity by an Imploding Molten Lead Shell and Richtmyer-Meshkov Instability", Pro-

(56) References Cited

OTHER PUBLICATIONS ceedings of the 20th Annual Conference of the CFD Society of Canada, Canmore, Alberta, Canada, May 9-12, 2012, in 8 pages.

International Search Report and Written Opinion for International Application No. PCT/CA2013/050272, mailed May 31, 2013, in 8 pages.

* cited by examiner

JET CONTROL DEVICES AND METHODS

CROSS-REFERENCE TO RELATED APPLICATIONS

This application is a U.S. National Phase of International Application No. PCT/CA2013/050272, filed Apr. 4, 2013, which claims the benefit under 35 U.S.C. §119(e) of U.S. Provisional Patent Application No. 61/620,326, filed Apr. 4, 2012, entitled "JET CONTROL DEVICES AND METHODS," each of which is hereby incorporated by reference herein in its entirety.

TECHNICAL FIELD

This disclosure relates generally to fluid jet control device and method of its use and more particularly relates to a fluid jet control device used to eliminate, reduce and/or deflect a flow of a high velocity fluid jet emerging out of a jet formation location.

DETAILED DESCRIPTION OF EXAMPLES OF JET CONTROL DEVICES AND METHODS

Overview

In systems where fluids are used as a working medium, high velocity fluid jets can be generated. Generation of high velocity fluid jets may provide various disadvantages such as loss of energy, mass or momentum of the working medium. In addition, fluid jets can escape out of a controlled space causing damage to equipment or surrounding systems. For example, in a plasma compressing system, a high velocity liquid jet can be generated by the collapse of a cavity enveloping and compressing the plasma. Such high velocity liquid jet may escape the plasma compression system and can enter into neighboring systems thereby causing damage to the equipment or performance of such systems.

Accordingly, there is a need to control the intensity and/or direction of the high velocity fluid jets such that the fluid jet does not reach a selected location and cause damage at that location.

SUMMARY

According to one aspect of the invention, there is provided a jet control device for disrupting or deflecting a fluid jet from reaching a selected location. The device comprises means for injecting a jet deflector material into a space containing a jet formation location at which the fluid jet is formed. The means for injecting is in communication with a jet deflector material source and has a discharge end directed at the jet formation location and is configured to inject the jet deflector material in such a manner that the fluid jet forming at the jet formation location is disrupted or deflected away from the selected location.

The jet deflector material can be in a liquid state, in which case the means for injecting is a liquid injector comprising a liquid conduit with an injection nozzle at the discharge end. The injecting means can further comprise a control valve for controlling the flow of the liquid jet deflector out of the nozzle and/or pressurization means coupled to the conduit and configured to supply sufficient pressure to direct a continuous stream of the liquid jet deflector material to the jet formation location, wherein the stream has a substantially uniform radius. The pressurization means can be a pump or a pressurized gas source.

Alternatively, the jet deflector can be in a solid state, in which case the means for injecting can be an extruder comprising a die and a ram configured to extrude the jet deflector material out of the extruder in the form of an elongated rod. The extruder can be further configured to extrude the jet deflector material in the form of an elongated rod having a length that extends continuously at least from the discharge end of the extruder to the jet formation location.

Instead of a solid state elongated rod, the jet deflector can be in a solid state in the form of discrete pellets, in which case the means for injecting is a pellet driver having a breach and a movable gate for controlling the injection of solid state jet deflector pellets at the jet formation location. The pellet driver can be a rail gun or a compressed gas gun. Each pellet can have a face surface with a concave shape.

According to another aspect of the invention, there is provided a plasma compressing system comprising a plasma generator, a plasma compression chamber, a pressure wave generator, a cavity generating means, and a jet control device. The plasma generator is configured to generate plasma and has a discharge outlet for discharging the generated plasma. The plasma compression chamber has an outside wall defining an inner cavity of the chamber and an opening; the inner cavity of the chamber is partially filled with a liquid medium and the discharge outlet of the plasma generator is in fluid communication with the inner cavity of the compression chamber via the opening such that the generated plasma can be discharged into the plasma compression chamber. The pressure wave generator comprises a plurality of pistons arranged around the chamber, wherein the pistons are configured to generate a converging pressure wave into the liquid medium. The cavity generating means is configured to generate an elongated empty cavity in the liquid medium; the cavity has a first end and a second end, wherein the first end is aligned at least partially with the discharge outlet of the plasma generator such that the plasma discharged by the plasma generator enters the elongated cavity. When the converging pressure wave reaches an interface of the cavity, the cavity collapses thereby enveloping the plasma. The jet control device comprises means for injecting a jet deflector material in communication with a jet deflector material source and having a discharge end directed at a jet formation location in the cavity. The means for injecting is configured to inject the jet deflector material into the cavity such that a fluid jet formed at the jet formation location is disrupted or deflected away from the plasma generator.

The jet deflector material can be in a liquid state, in which case the means for injecting is a liquid injector comprises a liquid conduit with an injection nozzle at the discharge end. The liquid injector can further comprise a control valve for controlling the flow of the liquid jet deflector out of the nozzle and/or pressurization means coupled to the conduit and be configured to supply sufficient pressure to direct a continuous stream of substantially uniform radius of the liquid jet deflector material to the jet formation location. The pressurization means can be a pump or a pressurized gas source.

Alternatively, the jet deflector can be in a solid state, in which case the means for injecting can be an extruder comprising a die and a ram configured to extrude the jet deflector material out of the extruder in the form of an elongated rod. The extruder can be further configured to extrude the jet deflector material in the form of an elongated rod having a length that extends at least from the discharge end of the extruder to the jet formation location.

Instead of a solid state elongated rod, the jet deflector can be in a solid state in the form of discrete pellets, in which case the means for injecting is a pellet driver having a breach and a movable gate for controlling the injection of at least one solid state jet deflector pellet at the jet formation location. The pellet driver can be a rail gun or a compressed gas gun.

The elongated solid rod or continuous liquid stream of the jet deflector material can have dimensions that cause the collapse of the cavity to occur at a surface of the elongated solid rod or continuous liquid stream.

The plasma compressing system can further comprise a shield disposed in vicinity of the opening of the plasma compression chamber, and having an annular configuration for inhibiting a blob of liquid medium from escaping the plasma compression chamber and entering the plasma generator. More particularly, the shield can be a wall projecting downwardly into the inner cavity of the chamber surrounding the opening. The shield can be a lip shaped constriction formed at an edge of the opening and projecting radially toward a center of the cavity.

The jet deflector material can have the same composition as the liquid medium in which case the system further comprises a liquid medium collection tank in fluid communication with the chamber and a fluid conduit fluidly coupling the collection tank with the jet deflector material source.

The plasma compressing system can further comprise a controller programmed to control a timing of the injection of the at least one solid state jet deflector pellet into the cavity such that the pellet is in proximity to the collapse point when the cavity collapses. Alternatively, the controller can be programmed to control a timing of the injection of the continuous liquid stream of jet deflector material into the cavity such that the cavity collapses at the surface of the continuous liquid stream.

According to another aspect of the invention, there is provided a method for protecting a plasma generator of a plasma compression system from a fluid jet formed in a compression chamber of the plasma compression system, comprising: directing a jet deflector material at a jet formation location at which the fluid jet is formed such that the fluid jet is disrupted or deflected away from the plasma generator. The compression chamber can contain a liquid medium in which case a cavity is generated in the liquid medium into which plasma is injected by the plasma generator, and the jet deflector material is directed into the cavity. A converging pressure wave can be generated into the liquid medium causing an interface of the cavity to collapse when the converging pressure wave reaches the interface; in this case, the jet deflector material is injected such that the cavity collapses at the surface of the jet deflector material.

The method can comprise maintaining a lower pressure inside the compression chamber than at a jet control device containing the jet deflector material, such that the jet deflector material is sucked into compression chamber and is directed to the jet formation location. Alternatively or additionally, the jet deflector material can be directed at the jet formation location by injecting the jet deflector material under pressure into the cavity. Alternatively, or additionally, the jet control device containing the jet deflector material can be located above and be in communication with the compression chamber such that the jet deflector material is directed at the jet formation location by gravity.

In addition to the aspects and embodiments described above, further aspects and embodiments will become apparent by reference to the drawings and study of the following detailed description.

BRIEF DESCRIPTION OF THE DRAWINGS

Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

Figure 7A:
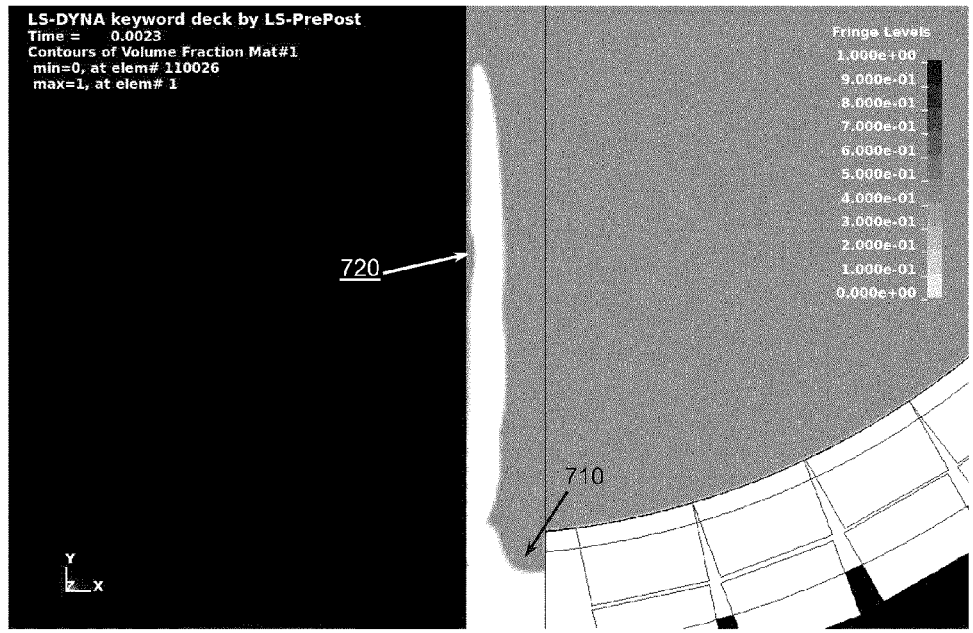
FIG. 7a is a partial cross-sectional view of a computational model of a plasma compression chamber illustrating an example of a central high speed liquid jet and a liquid blob when a jet deflector is not present in a vortex cavity. The legend bar at the right upper corner of the figure shows volume fractions of a liquid and a gas.
Figure 7B:
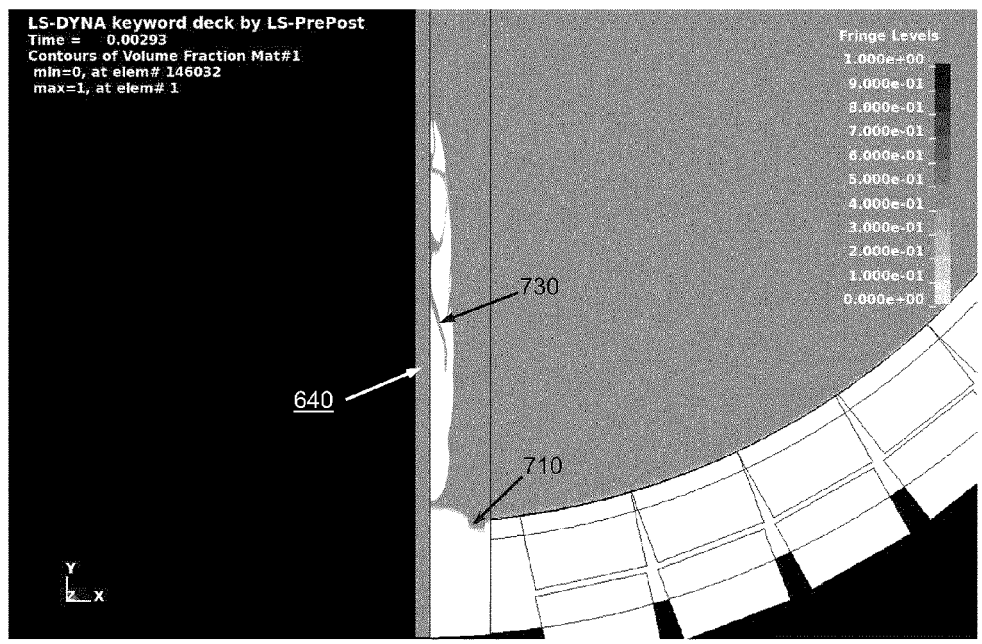
FIG. 7b is a partial cross-sectional view of a computational model of a plasma compression chamber illustrating an example of liquid jets and a liquid blob when a jet deflector is present in a cavity.
Figure 8A:
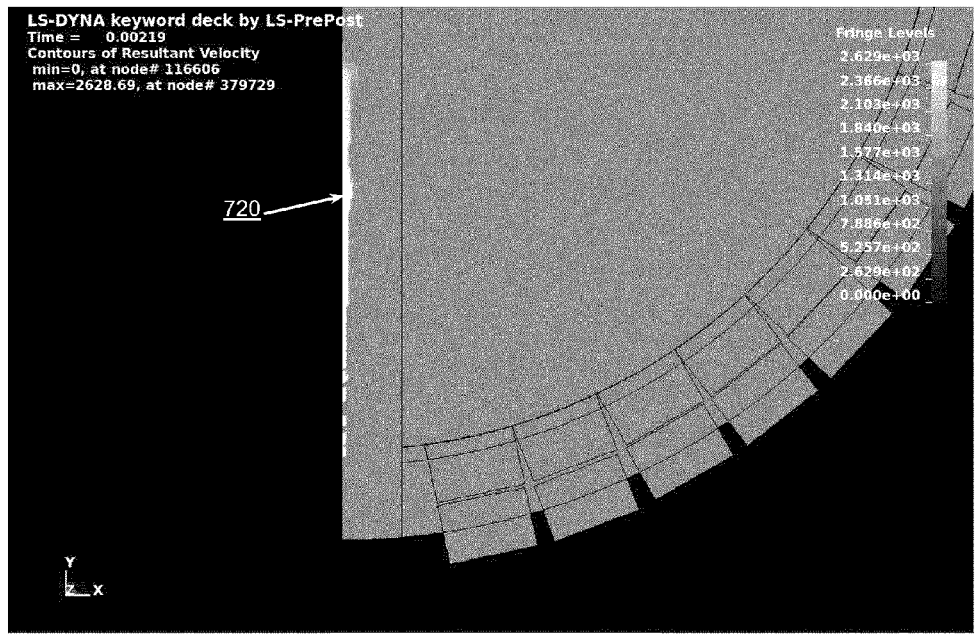
FIG. 8a is a partial cross-sectional view of a computational model of a plasma compression chamber illustrating an example of a central high speed jet velocity.
Figure 8B:
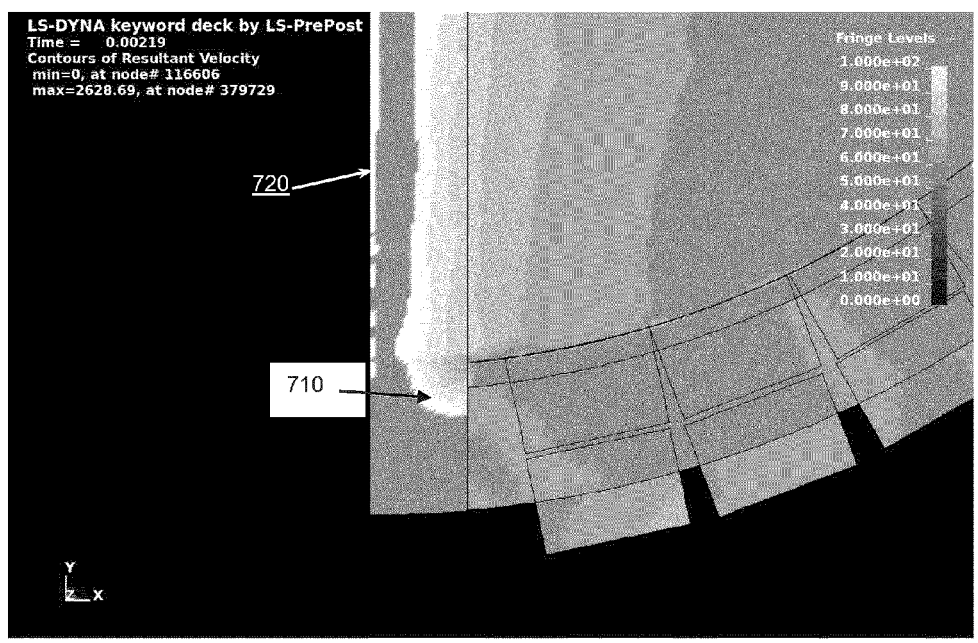
FIG. 8b is a partial cross-sectional view of a computational model of a plasma compression chamber illustrating an example of a liquid blob velocity.

Formation of high speed fluid jets can be a natural consequence during cavities' collapse and has been observed in the past, for example by Enriquez et al. in the work "Collapse of Nonaxisymmetric Cavities", Phys. Fluids 22 (2010) 091104, where a high speed central liquid jet has been produced when an air cavity formed by a collision of a solid body with a liquid reservoir collapses due to hydrostatic pressure. Formation of a high speed liquid jet can be a relevant factor to certain prototypes of a plasma compression system that are under construction at General Fusion, Inc. (Burnaby, Canada). In some examples of the plasma compression system, a cavity (e.g., a vortex cavity) can be created by spinning a liquid medium within a plasma compression chamber. Plasma can be injected within the vortex cavity of the compression chamber through a plasma generator. A converging pressure wave can be created in the liquid medium by a plurality of pneumatic pistons that are timed to impact an outer surface of the plasma compression chamber. Impact of the pistons generates a converging pressure wave that travels towards the center of the compression chamber. The converging pressure wave can collapse the vortex cavity and can envelop the plasma thereby compressing it. The pressure wave induced collapse of the vortex cavity can cause a formation of a central high speed liquid jet that can project away from a collapse point, along the axis of the vortex. In addition, a "blob" of a liquid medium can be created when the pressure wave approaches a plasma generator's nozzle. As used herein, a liquid blob can include (but is not limited to) a mass of liquid that is formed when a pressure wavefront approaches the generator's nozzle. The liquid blob can flow much slower than the central jet and can drip into the nozzle of the plasma generator. The liquid blob can have the form of a blob (e.g., a relatively amorphous mass of liquid) or can have the form of a spray, one or more drops or droplets, and so forth. Examples of a liquid blob are illustrated in FIGS. 7a, 7b and 8b. The central jet emitted from the collapse point and the blob of liquid medium may enter into the plasma generator thereby contaminating a plasma propagation channel or causing any other damage to the generator or any diagnostic system used in the compression chamber or the plasma generator.

Figure 1A:
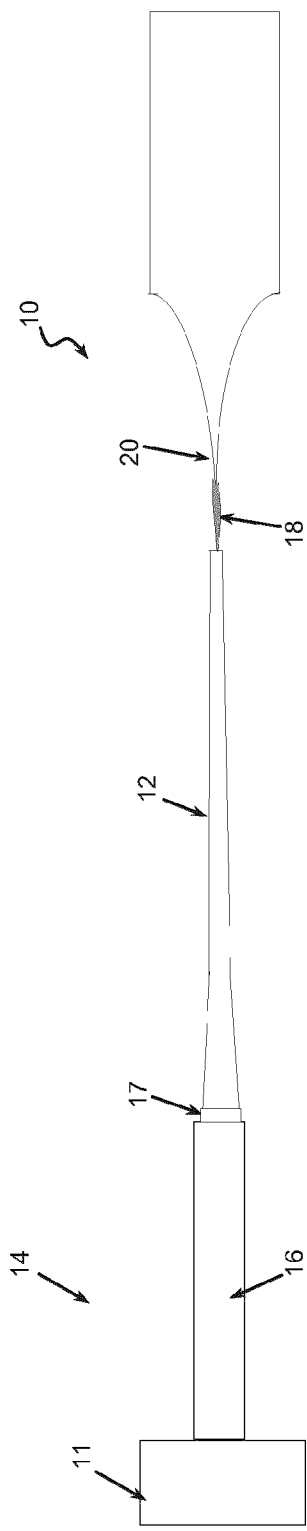
FIG. 1A is a schematic cross-sectional view of a jet control device configured to discharge a liquid jet deflector, according to one non-limiting embodiment.
Figure 1B:
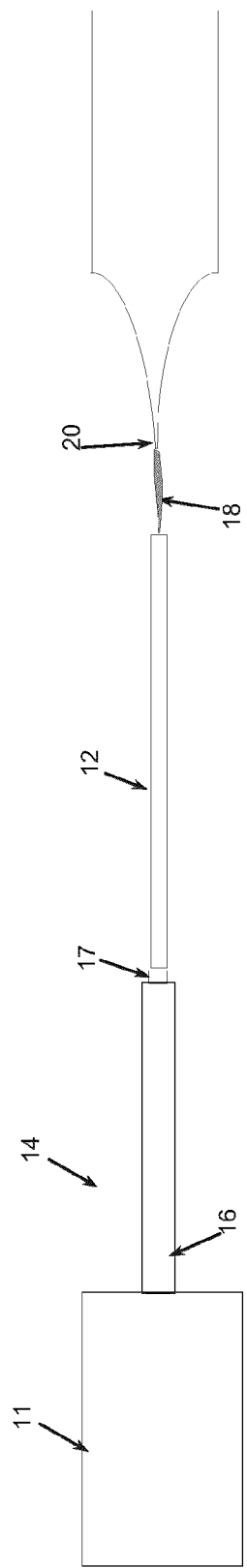
FIG. 1B is a schematic cross-sectional view of a jet control device configured to discharge a solid rod jet deflector, according to another non-limiting embodiment.

Embodiments of the invention described herein relate to a fluid jet control device 10 for directing a jet deflector material at a fluid jet formation location such that a fluid jet is prevented from forming at the fluid jet formation location, or is deflected or otherwise prevented from reaching a selected location, such as the aforementioned plasma generator. The fluid jet control device comprises a jet deflector material container and means for injecting the jet deflector material at the fluid jet formation location. The jet deflector material can be the same or different state and the same or different material composition as the fluid jet. FIG. 1A to FIG. 1B illustrate two different embodiments of the fluid jet control device, and FIGS. 2 to 9 relate to embodiments of the fluid jet control device installed in a plasma compression system to prevent a liquid jet formed at a jet formation location inside a compression chamber of the system from reaching a plasma generator of the system 100 (i.e. the selected location). However, it is to be understood that the jet control device is not restricted to only this application, and instead the jet control device can be used for eliminating, reducing and/or redirecting a high speed jet in any systems, devices or engines where jet control is desired.

In one embodiment and referring to FIG. 1A, a jet control device 10 is configured to direct a liquid state jet deflector material ("liquid jet deflector") 12 at a fluid jet 18 emerging from a jet formation location 20. The jet deflector material can have the same material composition or have a different composition than the fluid jet, and the fluid jet can be a liquid or a gas. The jet deflector container is a liquid reservoir 11, and the means of injecting is a liquid injector 14 having a liquid conduit 16 fluidly coupled at one end to the liquid reservoir 11 and a discharge nozzle 17 at an opposite end of the conduit 16. The liquid injector 16 can further comprise a control valve (not shown) for controlling flow of the jet deflector liquid out of the liquid injector 14.

In order for the liquid jet deflector 12 to be discharged from the liquid injector 14, a pressure differential can be provided between the liquid injector 14 and the environment containing the jet formation location 20; the pressure differential and amount of liquid jet deflector 12 should be large enough to cause the liquid jet deflector 12 to be injected (or sucked) into the environment at a mass flow rate that is sufficient to disrupt the fluid jet 18 or at least deflect the fluid jet 18 away from a location to be protected ("selected location"). Selection of this pressure differential and amount of liquid jet deflector 12 will depend on certain properties of the fluid jet, such as its density and flow rate. In one embodiment, the liquid injector 14 comprises a pressurization means such as a pump (not shown) coupled to the liquid conduit 16 and operable to pressurize the liquid jet deflector 12 in the liquid conduit 16 to a sufficient pressure above that of the environment containing the jet formation location 20 to provide the required pressure differential; in this case the liquid jet deflector 12 would be injected under pressure into the environment. In another embodiment, the jet control device 10 can be operated in an environment containing the jet formation location 20 that is at a sufficient pressure below that of the jet control device 10 to provide the required pressure differential ("negative pressure differential"); in this case the liquid jet deflector 12 would be sucked into environment when the control valve is opened. In yet another embodiment, the jet control device 10 is provided with a pressurization means and is operated in an environment having a lower pressure than the jet control device 10 such that a combination of the pressurization means and the lower pressure of the environment provides the required pressure differential.

In operation, the liquid jet deflector 12 is directed by the liquid injector 14 at the jet formation location, where the liquid jet deflector 12 collides with the fluid jet emerging from the jet formation location. When the fluid jet 18 collides with the deflector liquid 12 the direction of the fluid jet can be offset from its initial direction, and the fluid jet can be redirected away to a direction different from the initial jet direction and away from the target location. At the same time the velocity of the fluid jet can be decreased due to the collision with the deflector liquid 12. In addition, due to the collision between the fluid jet 18 and the liquid jet deflector 12, the cohesive body of the high speed jet can be fragmented reducing the size of the jet. A smaller jet is less likely to stay as a cohesive body and can further disintegrate into a spray of jets thereby reducing the jet's effects on equipment and systems surrounding an area influenced by such high speed jet.

In another embodiment and referring to FIG. 1B, a jet control device 10 is configured to direct a solid state jet deflector material 12 in the form of an elongated rod ("solid rod jet deflector") at the fluid jet 18. The means for injecting is an extruder 14 which extrudes the solid state jet deflector material 12 in the form of an elongated rod. The jet deflector container 11 can be configured to store jet deflector feedstock in a solid or liquid state. In the former case, the feedstock is in the form of solid blanks and the container 11 can be provided with conveyor means for conveying the blanks to the extruder 14. In the latter case, the jet deflector container is liquid reservoir 11 and is fluidly coupled to the extruder 14 such that the feedstock is flowed into the extruder 14 and solidified therein. The extruder 14 comprises a die 16 coupled to the jet defector container 11 at one end and also comprises extrusion nozzles 17 at an opposite discharge end. The extruder 14 also comprises a ram (not shown) to force the feedstock through the die. The extruder 14 can employ a hot or warm extrusion process in which case the extruder 14 can further comprise a heater thermally coupled to the die to heat the feedstock to a suitable extrusion temperature. The jet deflector material 12 can have the same material composition or have a different composition than the fluid jet 18. For example, the jet deflector material can be a lead or lead and lithium mixture.

The extruder 14 is configured to extrude the solid jet deflector 12 as an elongated rod that is long enough to reach the jet formation location while still being physically engaged with the extruder 14. The solid jet deflector 12 can be extruded to meet the fluid jet 18 at the formation location 20 when the momentum of the fluid jet is still low; the solid jet deflector can be stationary or moving at the jet formation location 20. The elongated rod 12 is dimensioned based on the parameters of the fluid jet 18 at the formation location 20.

The momentum of a fluid jet at the formation location can be calculated as:

$$P = \upsilon \times m$$

where $\upsilon$ is a speed of the fluid jet at the formation location (initial speed) and m is a mass of the fluid jet at the formation location.

For example, when a fluid jet is composed of molten lead with a mass of about 0.04-0.1 kg and a jet speed at the formation location of about 400-1500 m/s, the momentum of the fluid jet 18 at the formation location 20 is about 20-160 kg m/s. It is expected that when the solid rod jet deflector 12 is placed in a stationary position at the jet formation location 20, it will need to have dimensions of around 2-4 cm in diameter and around 1-10 m in length in order to deflect the direction of the fluid jet 18. If the elongated rod is injected with a speed of about 10 m/s the length of the rod can be in a range of about 0.1-3 m for a rod with diameter of about 2-4 cm.

In another embodiment, the jet deflector can be in a solid state in a form of discrete pellets. The pellets can be injected using a pellet driver having a breach and a movable gate for controlling the injection of the jet deflector pellets to the jet formation location 20. The pellet driver can be a rail gun or a compressed gas gun.

Figure 2:
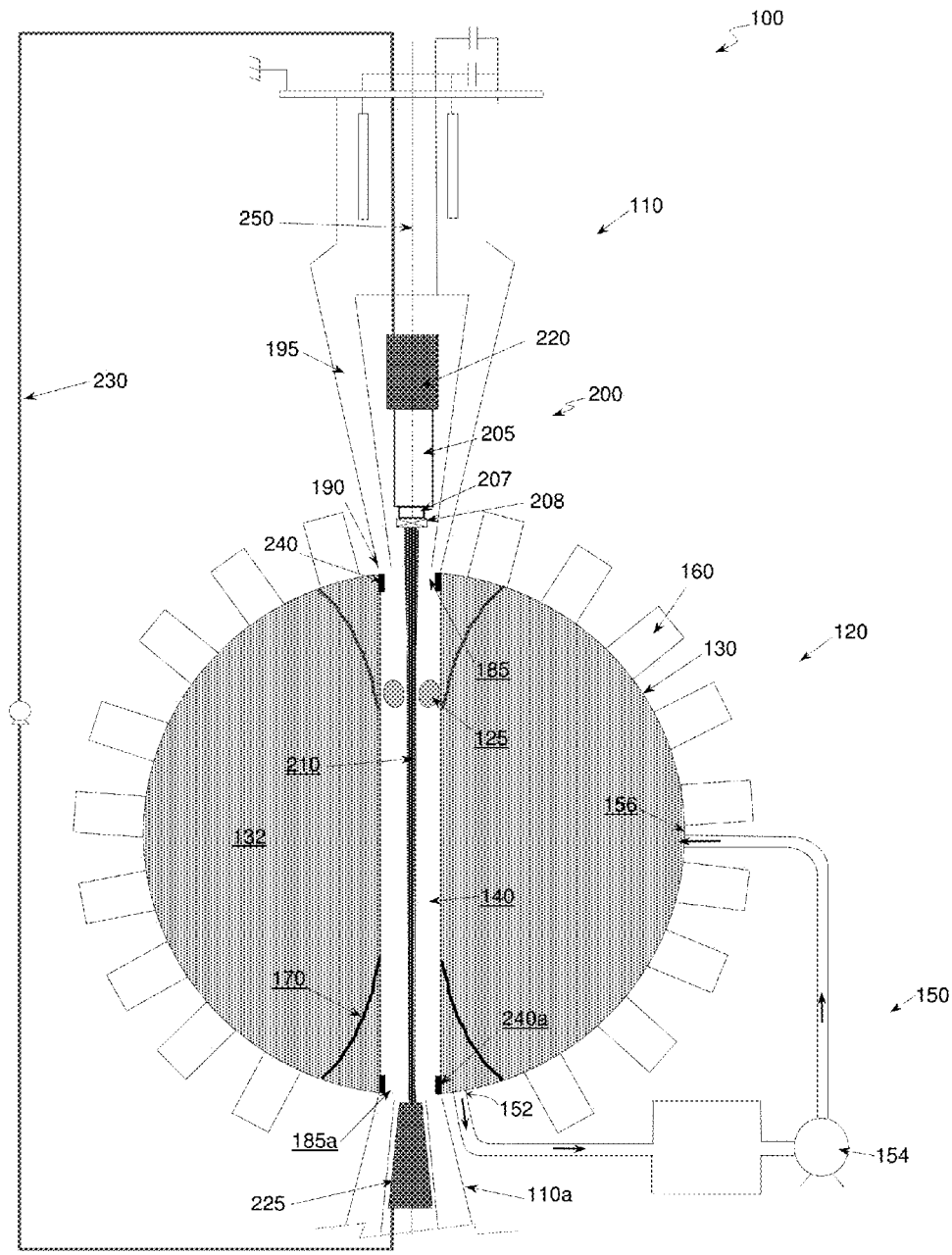
FIG. 2 is a schematic cross-sectional view of the embodiment of the jet control device shown in FIG. 1A installed in a plasma compression system.

Referring now to FIG. 2, the jet control device (numbered 200) according to the embodiment shown in FIG. 1A is installed in a plasma compression system 100 and operated to prevent liquid jets formed in a compression chamber 120 of the system 100 from reaching a plasma generator 110 of the system 100, wherein the liquid jets are formed from the liquid medium in the compression chamber 120. The jet control device 200 is configured to inject a stream of liquid jet deflector 210 into the compression chamber 120. The compression chamber 120 can be partially filled with the liquid medium in which an elongated empty cavity 140 can be formed. Plasma 125 can be injected in the cavity 140 by the plasma generator 110. The plasma 125 can be magnetized toroidal plasma such as, e.g., a spheromak, a field-reversed configuration (FRC) of plasma or any other compact toroid configuration or their combination or combinations. In one implementation any other gaseous medium can be injected into the cavity 140.

The compression chamber 120 comprises a wall 130 that defines an inner cavity 132 of the compression chamber, an opening 185 through which the plasma 125 can be injected into the cavity 140 and a plurality of pressure wave generators 160 arranged around the compression chamber 120. The inner cavity 132 of the chamber 120 can be partially filled with the liquid medium. The liquid medium can be a molten metal, such as lead, lithium, or sodium, or an alloy, combination, or mixture of metals. In one implementation, the elongated cavity 140 is formed by rotating the liquid medium contained within the compression chamber 120, and in particular, the compression chamber 120 comprises a vortex generator 150 for generating the elongated cavity 140. The vortex generator 150 includes an outlet conduit 152, a pump 154, and an inlet conduit 156. In the illustrated example, the pump 154 is operable to pump a portion of the liquid medium out of the chamber 120 through the outlet conduit 152 located near a pole of the chamber 120, and is operable to inject liquid medium into the chamber 120, tangentially near an equator of the chamber 120, through the inlet conduit 156. In one implementation, the outlet 152 is spaced from the pole towards the equator of the chamber 120. In an alternative embodiment (not shown), more than one inlet 156 and/or outlet 152 can be used to circulate the liquid medium within the chamber 120. Flow of the liquid medium at a sufficiently rapid rotational rate creates the cavity 140 that is substantially free of the liquid medium.

Other means known in the art for generating the cavity 140 can be used without departing from the scope of the invention. For example, in one implementation, the elongated cavity 140 can be formed, for example, by injecting jet(s) of liquid medium from an annular nozzle formed at the opening 185 of the compression chamber 120, or by passing a shaped solid object through the liquid medium at high speed, etc.

With respect to the embodiment shown in FIG. 2, the compression chamber 120 has a spherical shape with the opening 185 formed at a pole of the chamber 120. However, this is for illustration purposes only and the plasma compression chamber 120 can have another shape (e.g. cylindrical, spherical, ellipse, conical or any other suitable shape or combination thereof) and/or dimension without departing from the scope of the invention.

The elongated cavity 140 has a first end that is at least partially aligned with the opening 185. The plasma generator 110 is configured to generate and inject the plasma 125 into the cavity 140 through the opening 185. A second outlet end 190 of the plasma generator 110 is slightly inserted into the opening 185 to provide fluid communication between the plasma generator 110 and compression chamber 120. In the illustrated embodiment, the chamber 120 has two annular openings 185 and 185a, located at each pole of the chamber 120. Optionally, the system 100 can comprise a second plasma generator 110a (shown only partially in FIG. 2), which is positioned diametrically opposite the first plasma generator 110. Each of the two openings 185, 185a are in communication with the two separate plasma generators 110 and 110a. Details regarding various embodiments of plasma generator 110, 110a that can be used with the system 100 are described in the commonly owned U.S. Patent Application Publication No. 2006/0198483, U.S. Patent Application Publication No. US2011/0026657 and U.S. Patent Application Publication No. US2011/002665, incorporated by reference herein in their entirety.

In one implementation, the elongated cavity 140 has a substantially cylindrical shape and extends all the way through the chamber 120 from one pole of the chamber 120 to the opposite pole. In another implementation, the cavity 140 has a more conical shape which extends throughout the whole length of the chamber 120 (pole to pole) or only partway through the length of the chamber 120. The elongated cavity 140 can be positioned substantially vertically or substantially horizontally in the chamber 120 without departing from the scope of the invention. At least one end of the cavity 140 needs to be aligned with the opening 185 and the second end 190 of the plasma generator so that the plasma 125 (or any other gaseous medium) can be injected into the cavity 140.

The plurality of pressure wave generators 160 are configured to create a pressure wave in the liquid medium contained within the chamber 120. The pressure wave generators 160 are oriented radially, outwardly from the wall 130. The pressure wave generators 160 are operable to generate a pressure wave in the liquid medium by impacting the wall 130 of the chamber 120. In one embodiment, the pressure wave generator 160 includes a hammer piston that is driven to impact the wall 130 of the chamber 120. The kinetic energy due to the piston impact can cause a compression wave in the wall 130 which travels through the wall and into the liquid medium, thus generating the pressure wave in the liquid medium. The generated pressure wave should propagate through the liquid medium and converge toward the center of the chamber 120. In another embodiment, a pressure wave generator 160 comprises a transducer that is secured within a corresponding opening in the wall 130 or otherwise coupled to the wall 130. A pressure wave is generated by impacting the transducer with a corresponding hammer piston. Details regarding various embodiments of pressure wave generators 160 that may be used with various embodiments of the system 100 can be found in co-owned U.S. Patent Publication No. 2010/0163130 and International Patent Application (PCT) Publication No. WO 2012/113057, which are incorporated by reference herein in their entirety.

The number and position of the pressure wave generators 160 can be selected so that a pressure wave with desired shape and amplitude can be generated in the liquid medium. For sake of clarity, FIG. 2 shows only some of the pressure wave generators 160.

Plasma is generated and accelerated by the plasma generator 110, (and 110a, if used) and is injected into the compression chamber 120 through the outlet end 190 and the opening 185. The outlet end 190 is aligned with the opening 185 of the chamber 120. The generated converging pressure wave can have a leading edge or wavefront 170. The converging pressure wave can travel through the liquid medium and can strike a cavity interface (liquid/gas interface). As a result, the interface can undergo rapid acceleration and can continue its movement towards a center of the chamber 120, collapsing the cavity and compressing the plasma 125 within the converging cavity (see FIG. 3). Timing of the impact and thus generation of the converging pressure wave can be precisely controlled so that the plasma can be injected into the cavity 140 before it collapses. The collapse of the cavity 140, induced by the converging pressure wave, can trigger generation of a high speed central jet of the liquid in the chamber 120 (not shown in FIG. 2, but shown as 180 in FIG. 3). The liquid jet can have the form of a "spike" of liquid directed centrally away from a collapse point. When the liquid jet emitted from the collapse point moves in a direction toward the plasma generator(s) 110, 110a the liquid jet can enter and/or damage the generator(s) 110, 110a or contaminate a plasma propagating channel 195 in the generator(s) 110, 110a.

In order to reduce the likelihood that the central jet enters the plasma generator 110, 110a, the jet control device 200 is employed to disrupt or deflect the liquid jet from reaching the plasma generator(s) 110, 110a. The jet control device 200 comprises a liquid injector that includes a liquid conduit 205 with an outlet nozzle 207. The jet control device 200 can further comprise a control valve 208 configured to close and open the outlet nozzle 207. The jet control device 200 is oriented such that a liquid jet deflector 210 can be injected from the jet control device 200 into the cavity 140 along its axis 250. A liquid storage tank 220 is fluidly coupled to the conduit 205 and supplies the liquid jet deflector to the conduit. The liquid storage tank 220 is placed within a central part of the plasma generator 110. In one embodiment the storage tank 220 can be electrically insulated from the plasma generator 110.

The liquid jet deflector 210 in this embodiment has the same composition as the liquid medium in the compression chamber 120 which may be advantageous in view of the likely mixing of the liquid of the deflector 210 and the liquid medium of the chamber 120. For example, the liquid jet deflector 210 and the liquid medium in the chamber is a molten metal, such as lead, lithium, or sodium. Alternatively, the liquid jet deflector 210 can have a different composition from the liquid medium in the chamber 120, provided the deflector 210 is in a liquid state under operating conditions and a system for separating the different material of the deflector 210 from the liquid medium in the chamber 120 is provided (not shown).

The plasma compression chamber 120 is typically maintained at a pressure that is lower than the pressure inside the plasma generator 110; as the liquid storage tank 220 is located in the plasma generator 110, a negative pressure differential would thus exist between the jet control device 200 and the cavity 140 containing the jet formation location. Also, the jet control device 200 is positioned above the cavity 140 such that the nozzle 207 is aimed downwards. Therefore, gravity and a suction force caused by the pressure differential will cause the liquid jet deflector 210 to flow from the liquid storage tank 220 to the fluid conduit 205 and then out of the outlet nozzle 207 and into the cavity 140 when the control valve 208 is opened. As will be described in more detail below, the pressure differential between the jet control device 200 and the cavity 140 can be configured to provide (with the assistance of gravity) the liquid jet deflector 210 with a sufficient mass flow rate to disrupt or deflect a liquid jet from reaching the plasma generator(s)) 110, 110(a). Optionally, pressurization means such as a pump or pressurized gas supply (neither shown) can be coupled to the conduit 205 to increase the pressure differential to the required degree.

To determine the pressure required to provide the required mass flow rate of the liquid jet deflector 210, certain operating parameters for the liquid jet deflector 210 are defined. First, the liquid jet deflector injection system 200 should inject enough liquid jet deflector material into the cavity that a continuous stream of liquid extends from the nozzle 207 and into the cavity 140. Also, the radius of the liquid jet deflector 210 stream should be as uniform as possible along its length and therefore the liquid jet deflector 210 can be injected with an initial velocity sufficient to prevent a narrowing of the liquid jet deflector 210 as it flows down the cavity 140 due to the gravity. From the energy balance is known that:

$$V_{bottom}^2 - V_{top}^2 = 2gH,$$

where $V_{top}$ and $V_{bottom}$ are velocities of the liquid jet deflector 210 at the top (in proximity to the control valve 208) and at the bottom (opposite end of the liquid jet deflector 210); g is acceleration due to gravity and H is a length of the liquid jet deflector 210. For a compression chamber 120 with a height of about ~3 m and a cavity 140 extending from one pole of the chamber 120 to the other pole, the liquid jet deflector has a length of about 3 m (extending throughout the whole length of the cavity 140). If we assume that the change in the velocity is for example less than 25% ($V_{bottom} = 1.25\ V_{top}$) than the injection velocity is:

$$V_{top} = \sqrt{\frac{2gH}{1.25^2 - 1}} \approx 10 \text{ m/s}$$

In order to achieve this injection velocity, the fluid has to be injected under pressure $$P = \frac{1}{2}\rho V_{top}^2.$$

For a molten lead deflector with density $\rho=10000$ kg/m³ and $V_{top}=10$ m/s the pressure required to inject the liquid jet deflector 210 is about P=500000 Pa≈5 Atm and can be provided by pressurization means such as a compressed gas in the liquid tank 220 to push the molten metal down the conduit 205 or by maintaining a pressure differential between the jet control device 200 and the cavity 140, or by both. This is for illustrative purposes only and liquid jet deflector 210 with higher initial velocity can be injected without departing from the scope of the invention, assuming that a deflector with more or less uniform radius along its length is provided. The radius of the liquid jet deflector 210 ($R_{deflector}$) depends on the radius of the cavity 140 ($R_{cavity}$) and is a fraction of the radius of the cavity. For example, the radius of the liquid jet deflector 210 is around $0.1 R_{cavity} \leq R_{deflector} \leq 0.2 R_{cavity}$. The material composition of the liquid jet deflector 210 can be the same as the liquid medium in the compression chamber 120. For example, for a cavity with a radius of about 20 cm the radius of the liquid jet deflector 210 is about 2-4 cm.

A liquid circulation assembly 230 can be used to recirculate the liquid from the collection tank 225 back into the storage tank 220 for reuse; this assembly 230 comprises a fluid conduit having an inlet fluidly coupled to the collection tank 225 and an outlet coupled to the liquid storage tank 220. When the deflector 210 is a continuous liquid column flowing throughout the entire length of the vortex, the formation of the high speed liquid jet 180 can be prevented since the collapse of the cavity is not at a point but rather at a surface of the liquid jet deflector 210. So, one or more jets that can be generated during the collapse of the cavity 140 at the deflector's surface should be directed by the liquid jet deflector 210 into a main liquid body in the chamber 120.

In one implementation, the liquid jet deflector 210 is injected into the cavity 140 in a controlled and timed manner. A controller (not shown) is provided which is programmed to control an opening of the control valve 208 and/or a generation of the pressure wave so that the liquid jet deflector 210 can be injected and extended at least partially throughout the length of the cavity 140 when the plasma enters the cavity 140 so that the collapse of the cavity can happen at the surface of the liquid jet deflector 210. The dimensions of the liquid jet deflector 210 can vary depending on the energy of the emerging jet. For example, the length of the deflector 210 stream can be the same as the radius of the compression chamber 120. In some implementations, the length of the deflector 210 stream can be less or more than the radius of the compression chamber 120.

As noted above, the liquid jet deflector 210 can be injected under pressure, using a pump or compressed gas to push the liquid jet deflector 210 into the conduit 205 and out of the nozzle 207. The pressure can be selected to cause the liquid jet deflector 205 to flow into the cavity 140 and collide with a high speed liquid jet emerging at the collapse point. For example, a liquid jet deflector 210 stream with radius of about 2-4 cm and a flow rate of about 10 m/s or more that meets a liquid jet at the collapse point or close to the collapse point (a jet momentum of about ~20-160 kg m/s) can break up the cohesive body of the jet into smaller jets that can be redirected into the main body of liquid medium. The injection of the liquid jet deflector 210 and its energy (or pressure) can be synchronized with the cavity collapse in such a way that the bulk of jet's energy is reduced and the jet is prevented from reaching the generator's outlet end 190.

In another embodiment a jet control device as shown in FIG. 1B can be installed in a plasma compression system 100 like the one shown in FIG. 2 and operated to prevent liquid jets formed in a compression chamber 120 of the system 100 from reaching a plasma generator 110 of the system 100, wherein the liquid jets are formed from the liquid medium in the compression chamber 120. The jet control device is configured to inject a continuous solid rod jet deflector 210 into the compression chamber 120; the blanks contain enough feedstock material for the extruder 14 to form a solid rod with enough length to extend from the extrusion nozzle 17 throughout the entire length of the cavity 140. In some modes of operations, the solid rod jet deflector 12 can be destroyed completely or partially during the operation of the system 100. Hence, it can be advantageous for the solid rod jet deflector 12 to be made of the same metal as the liquid metal in the chamber 120. In such case, a new solid rod jet deflector 12 can be extruded by using some of the liquid metal in the chamber 120. The solid rod jet deflector 12 can have various different sizes and shapes depending on the size of the cavity 140 and/or the size and the shape of the chamber 120. It can be dimensioned so that it does not interfere with the plasma entering the cavity. For example, the deflector can be cylindrically shaped with a diameter of about ⅕-1/10 of a diameter of the cavity 140.

In an alternative implementation, a jet control device (not shown) is configured to inject both a solid rod jet deflector and a liquid stream jet deflector simultaneously. The jet control device is provided with an extruder like the embodiment shown in FIG. 1B, and also has a liquid injector like the embodiment shown in FIG. 1A positioned beside the extruder, such that the liquid stream flows alongside the solid rod into the cavity. Alternatively, the extruder is located coaxially and inside the liquid injector, such that the liquid stream in injected around the periphery of the solid rod and flows around the length of the rod into the cavity. The composition of the liquid stream can be lithium and can form a thin layer of lithium over the solid rod jet deflector, which is expected to present a low Z material at a plasma-facing surface and thus minimize radiation losses due to plasma contamination. Alternatively, both the solid and liquid jet deflectors can be made of a different material from the liquid medium, in which case the system is provided with means for separating the material of the deflector 210 from the liquid medium. After separation, the liquid medium is returned into the compression chamber 120 while the jet deflector material is returned to the jet control device.

For plasma compression systems 100 using either the liquid jet control device 10 of FIG. 1A or the solid rod jet control device 10 or FIG. 1B, the interaction of the pressure wavefront and the outlet end 190 of the generator 110 can result in a blob of liquid medium forming near the outlet 190. In order to inhibit or prevent such a liquid blob from entering the plasma generator 110 (or the generator 110*a*, if used) the jet control device 200 further comprises a shield 240, as can be seen in FIG. 2. The shield 240 can prevent the blob of liquid medium from entering the outlet end 190 of the generator 110. When a second plasma generator 110*a* is used, the jet control device 200 comprises a second shield 240*a*, generally similar to the shield 240, which is located near the second plasma generator's 110*a* outlet end.

In the embodiment shown in FIG. 2, the shield 240 is connected to the wall 130 in proximity to the annular opening 185; alternatively the shield 240 forms an integral part of the wall 130. In either case, the shield 240 for the downwardly facing plasma generator 110 is a cylindrical body (e.g., a skirt) extending downwardly from an inner surface of the wall 130 (and extending upwardly for the upwardly facing plasma generator 110a). The shield 240, 240a is dimensioned so that it can prevent the liquid blob from entering the plasma generator(s) 110, 110a. For example, the length of the shield 240, 240a can be around 1/10 to 1/7 of the height of the plasma compression chamber 120 (0.2-0.4 m for the plasma compression system 100 shown in FIG. 2 having a chamber 120 with a height about 3 m). In another embodiment (not shown), the shield 240, 240a forms an integral part of an outlet end 190 of the outer wall of the plasma generator 110, 110a. As the outlet end 190 of the generator 110, 110a is inserted into the opening 185, 185a, the outer wall of the generator 110, 110a can protrude further within the compression chamber 120 forming a vertical, annular, wall around the outlet end 190. The shield 240, 240a can be so shaped and dimensioned not to interfere with the cavity formation and/or cavity generation system and can be tuned to fit a specific geometry of the compression chamber 120. The walls of the shield 240, 240a can be parallel to the axis 250 or can be slightly angled with respect to the axis 250.

Figure 3:
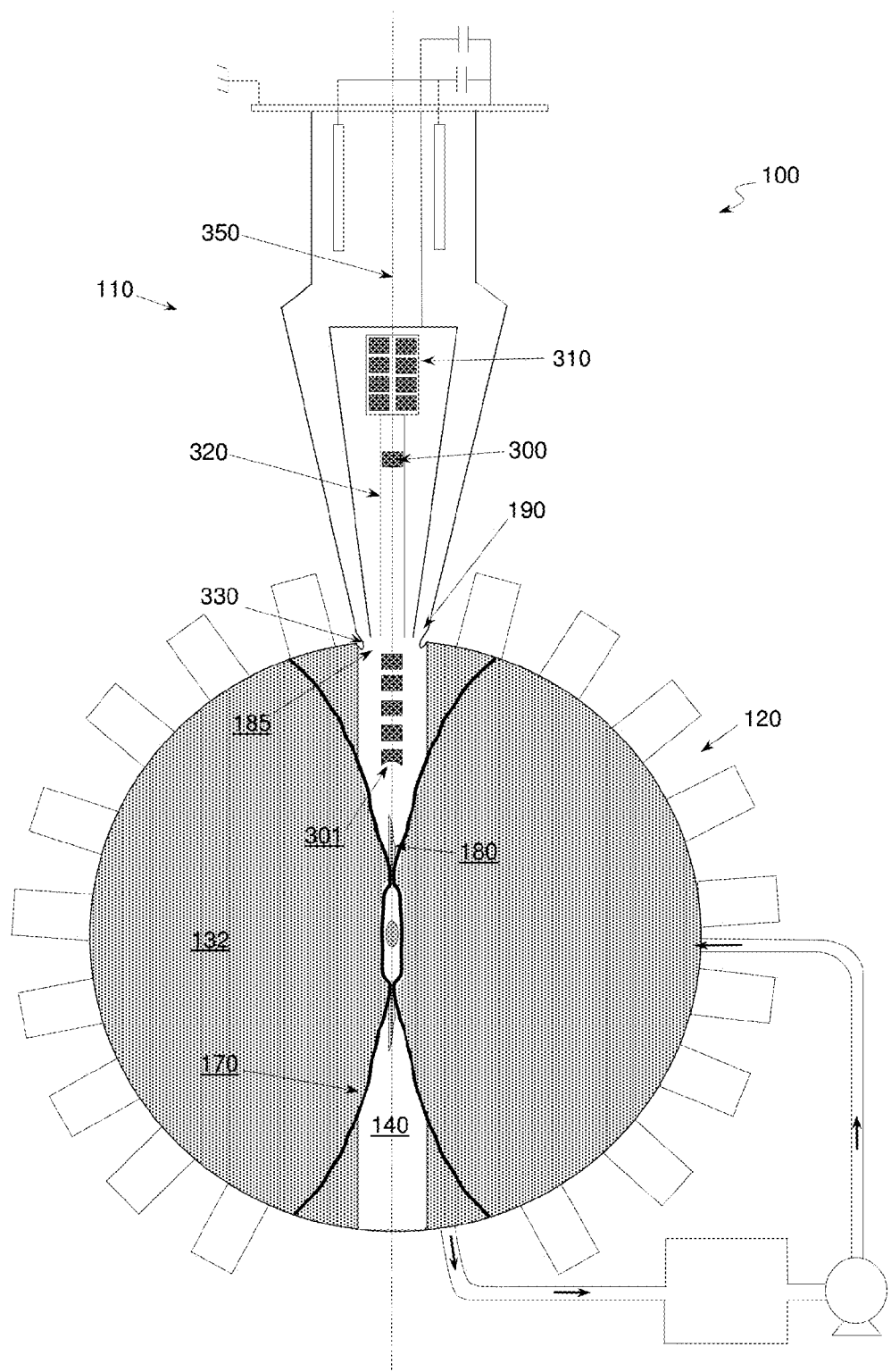
FIG. 3 is a schematic cross-sectional view of a jet control device configured to discharge solid pelletized jet deflectors according to another non-limiting embodiment, and installed in a plasma compression system.

In another embodiment and referring to FIG. 3, a liquid jet control device is configured to direct a jet deflector 300 in the form of a plurality of solid state pellets 300 ("solid pellet jet deflector") at the liquid state fluid jet ("liquid fluid jet") 180. The means for injecting is a pellet driver 320 such as a rail gun as shown in FIG. 3; however, other pellet drivers can be provided such as a compressed gas gun. The rail gun is positioned inside the plasma generator 110 and faces downwards into the chamber 140 along an axis 350 wherein the cavity 140 is expected to form.

Instead of a pellet driver, the means for injecting can be a passive pellet injector in the form of a downwardly facing conduit with a controllable gate (not shown) at a discharge end of the conduit. The conduit is sized to store a single line of pellets, and the gate can be opened to allow the pellets 300 to be discharged into the cavity 140. The pellet injector can be used when there is a sufficient negative pressure differential between the jet control device 110 and the chamber 120 to extract the pellets 300 (with the assistance of gravity) from the conduit and into the cavity 140 such that the pellets achieve sufficient velocity to disrupt or deflect a liquid jet 180 emerging from the liquid jet formation location.

The jet control device further includes a pellet container 310 storing the pellets 300 and having a loading mechanism for delivering the pellets to the pellet driver 320. The container 310 comprises an inlet (not shown) through which a refill of additional pellets can be provided and an outlet through which a controlled release of a pellet from the container 310 into the pellet driver 320 can be made. The loading mechanism can be a conveyor belt which loads the pellets 300 into a breach of the rail gun 320; the rail gun 320 can be operator to fire the pellets 300 in a relatively rapid sequence along the axis 350. In some cases, a brief time period can be provided (1-2 s) to allow for loading of the next cartridge of pellets 300.

One or more pellets 300 can be injected into the cavity 140 in order to intercept and collide with a central liquid jet 180 that can be generated upon collapse of the cavity 140. For example, the pellets 300 can be injected so that they move along the axis 250 to intercept the jet 180. The pellets 30 are sized to counteract the momentum of the emerging jet 180 at the collapse point. Flow velocities in the pellets 300 can range from a few tens m/s to a few hundreds of m/s, depending on the implementation and operating conditions. For example, for a fluid jet with a momentum $P=v \times m$ at the collapse point of about 20-160 kg m/s and a lead pellet with mass of about 0.08 kg (cube of 2 cm) to 0.64 kg (cube of 4 cm) the velocity of the pellets 300 is about 30-2000 m/s. The pellets 300 can be sized and shaped accordingly not to interfere with the plasma entering the cavity 140 or to disturb the cavity 140 itself (for example, the size of the pellet can be around 1/5 to 1/10 of the diameter of the cavity 140). Each pellet 300 is configured to collide with and deflect the high speed jet 180 dispersing it into a plurality of smaller jets. In particular, each pellet 300 has a face surface 301 sized and shaped to deflect an initial direction of the high speed jet 180 to a desired new direction. For example, the pellet 300 can have a concave or a cone-shaped face surface 301. Each pellet 300 can be made of the same material as the liquid medium in the chamber 120 and can have various different shapes such as for example, spherical, ellipsoidal, cylindrical, rectangular, or any other suitable shape.

The jet control device may further include a timing system (not shown) configured to coordinate the release and the injection of the pellet 300 with the cavity collapse and formation of liquid jet 180. In one implementation a single pellet 300 can be injected to intercept and redirect the liquid jet 180. In another implementation, an array of pellets 300 can be injected in the cavity 140. The liquid jet 180 may be intercepted by the one or more of the pellets 300. When the pellets are of the same composition of the liquid medium, part of the liquid medium in the chamber 120 is extracted for manufacturing new pellets 300 (means for manufacturing the pellets not shown).

The jet control device can further include a liquid blob shield such as a constriction 330 that is formed in proximity to the annular opening 185 of the chamber 120. The constriction 330 can be configured so to allow the plasma to pass over the constriction 330 but to prevent the liquid blob, formed when the pressure wave 170 approaches the outlet end 190, to enter into the plasma generator 110. The constriction 330 can act as a lip formed at the entrance (outlet end 190) of the generator 110. It can protrude slightly downwardly toward the inside of the chamber 120 and can be configured to be an integral part of the chamber 120 or of the outer wall of the generator 110. In addition, the constriction 330 can at least partially prevent the jet 180 from entering the plasma propagation channel and thus can act as a shield and/or a deflector with respect to the jet 180 as well. In some implementations, both the constriction 330 and the shield 240 can be used to prevent the blob of liquid material entering the generator(s) 110, 110a.

Simulations of the cavity collapse and subsequent formation of the fluid jets have been carried out using the computational fluid dynamics (CFD) code OpenFOAM (available from the OpenFOAM Foundation, Winnersh, United Kingdom) and finite element analysis (FEA) code LS-DYNA (available from Livermore Software Technology Corporation, Livermore, Calif.). Example results of the simulations are illustrated in FIGS. 4-9.

A CFD simulation of a cylindrical plasma compression system having a radius of 1.5 m and height of 2 m was carried out using cylindrical geometry. The radius of the cavity was set to be 0.2 m and the cavity was set to extend over the entire height of the cylinder. Simulations were carried out by using a molten metal such as a molten lead or mixture of molten lead and lithium as an example of the fluid. Sound speed in the fluid (e.g., lead) was taken as 1800 m/s. Simulations were carried out for three different amplitudes of a pressure pulse:

1. $P=1.5\times10^{10}$ Pa, which corresponds to the pressure amplitude in one prototype plasma compression chamber near the cavity interface in the case of a spherically converging wave;
2. $P=2\times10^9$ Pa, which corresponds to an initial pressure amplitude in a small size compression chamber and for a piston velocity of about 50 m/s;
3. $P=5\times10^8$ Pa, which corresponds to the pressure amplitude in the small size compression chamber for a piston velocity of about 15 m/s.

Figure 4:
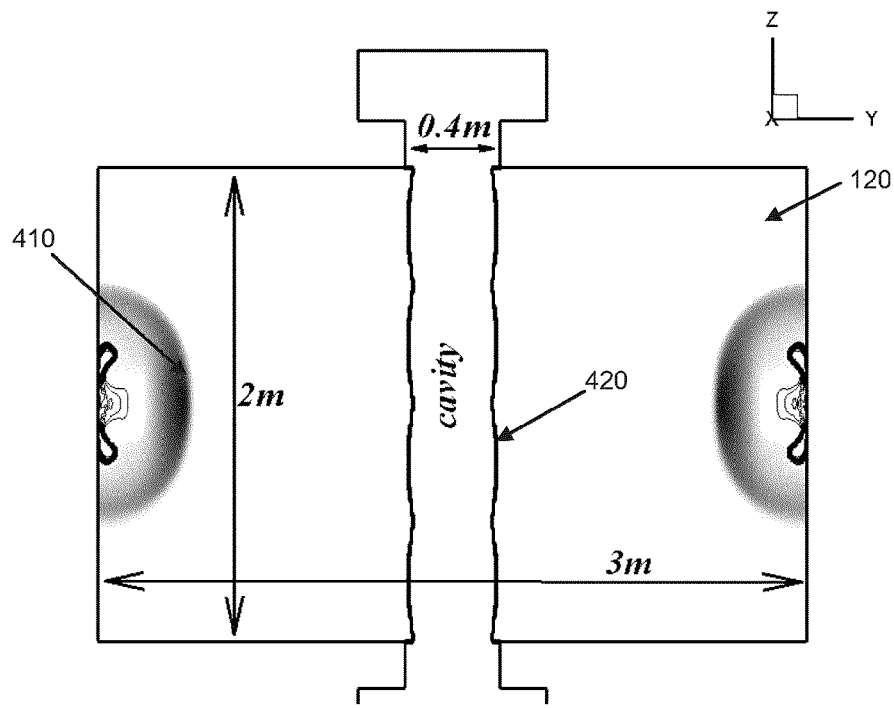
FIG. 4 is a vertical cross-sectional view of a computational model of a plasma compression chamber illustrating an example of a pressure wavefront at early stages of propagation and a cavity shape.
Figure 5:
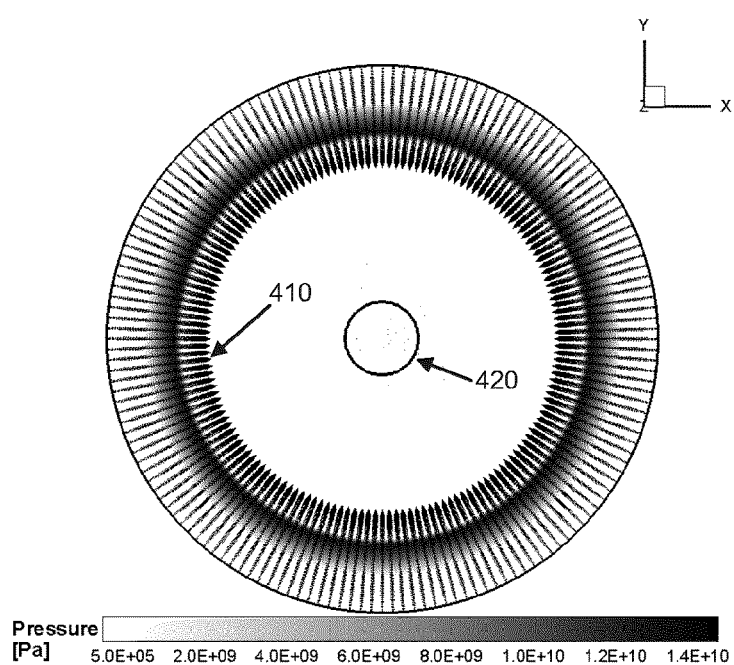
FIG. 5 is a cross-sectional view in a horizontal direction of the computational model of the plasma compression chamber of FIG. 4. The legend bar at the bottom of the figure shows fluid pressure in Pascals.

FIGS. 4 and 5 illustrate vertical and horizontal cross-sections of the CFD computational model for a pressure pulse with an amplitude of $P=1.5\times10^{10}$ Pa (the cross-sections look generally similar for the other pressure pulse amplitudes). The curved section 410 (FIGS. 4 and 5) shows a pressure pulse at early stages of propagation. Solid, vertical black lines 420 of FIG. 4 and circular-shaped curve 420 of FIG. 5 show an initial fluid/gas interface of the cavity 140 in a vertical direction (FIG. 4) and in a horizontal direction (FIG. 5), respectively.

For a pulse with $1.5\times10^{10}$ Pa, particle velocity is around 800 m/s (for lead as fluid) calculated by the following equation (1).

$$V_{particle}=P/(\rho\times c) \quad (1)$$

where P is a pressure of a pulse, $\rho$ is the density of the fluid and c is the speed of sound in the fluid.

A shape of the collapse of the cavity depends at least partly on a pressure distribution along the cavity interface at a time when the pressure pulse hits the interface. The initial velocity of the interface is proportional to the particle velocity of the pressure pulse which in turn is proportional to the pressure at the time the pressure pulse reaches the interface. As showed in FIGS. 4 and 5, the pressure pulse 410 has a spherical shape so the pulse in the central part of the chamber (e.g., along a midline or equator of the cylindrical chamber shown in FIG. 4) may reach the cavity interface first. Away from the midline, the pressure pulse will arrive at the cavity interface after a time delay. Therefore, the arrival of pressure pulse along the length of the cavity will occur over a time interval. For a high amplitude pressure pulse (e.g., $P=1.5\times10^{10}$ Pa), the interface velocity (V interface=$2\times V_{particle}$) in the fluid can be of the order of magnitude as the speed of sound in the fluid based on the linear relation. For example, an interface velocity in lead is around approximately 1600 m/s which is close to the speed of sound in the lead approximately 1800 m/s. In this example, the time delay of the arrival of the pressure pulse along the length of the cavity interface may be relatively large so that a pinch collapse of the cavity occurs in the center of the chamber. For a low amplitude pulse, the interface velocity can be much slower than the speed of sound in the fluid so that the time delay of the pressure pulse arrival along the length of the cavity becomes negligible, resulting in a more uniform collapse along the length of the cavity interface (as compared to a high amplitude pressure pulse). The numerical simulations show that regardless of the shape of the cavity collapse (e.g., pinch collapse or more uniform collapse of the cavity interface), such cavity collapse results in generation of a high speed central jet and a liquid blob (see the example shown in FIG. 7a).

Figure 6:
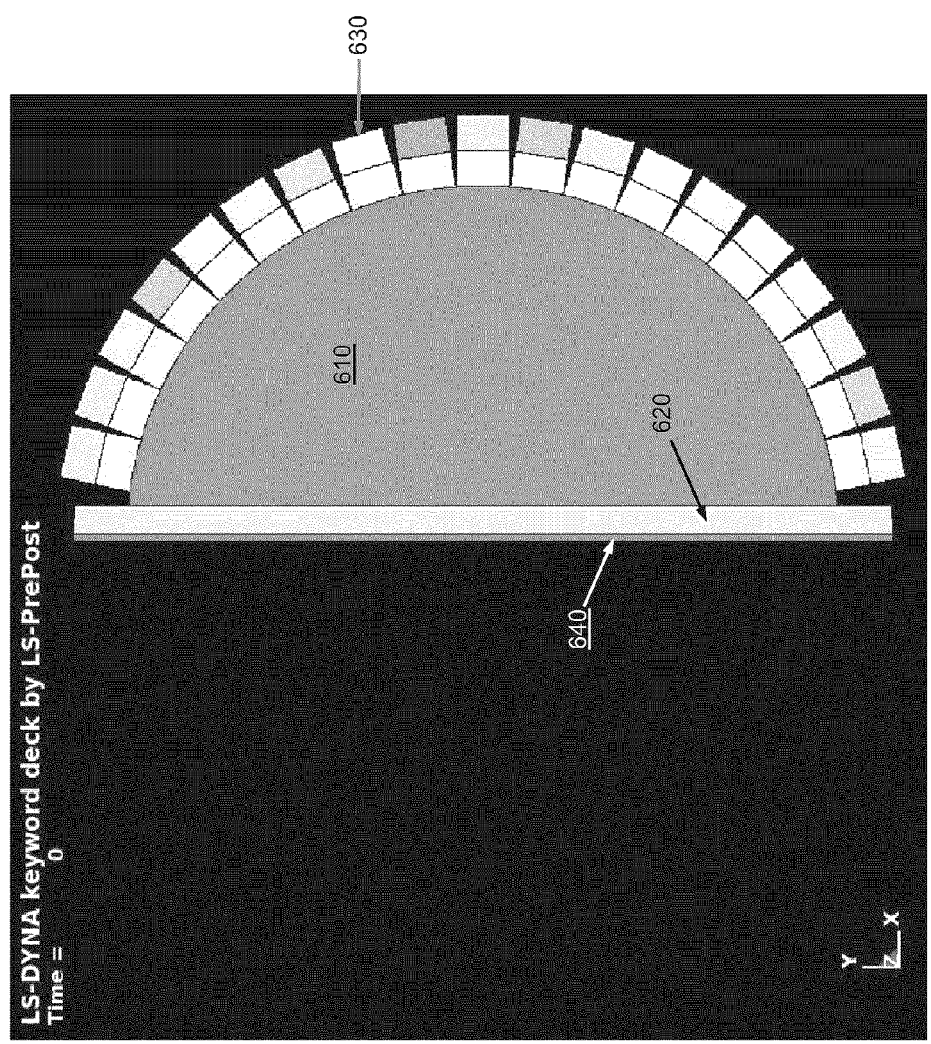
FIG. 6 is a partial view of a computational model of a plasma compression chamber illustrating an example of a plurality of pistons arranged around a chamber's wall and an example of a jet deflector inserted centrally within a cavity.

The FEA code was used to model the piston system, the fluid (e.g., lead) and the vacuum/air in a elliptical plasma compression vessel. The modeling was done for a 2-dimensional axisymmetric geometry. FIG. 6 illustrates an example of the simulated model. The interior 610 of the elliptical vessel is filled partially with fluid (e.g., lead or lead/lithium mixture). The cavity is shown by reference sign 620, and the pistons are shown by reference sign 630. The inner radius of the vessel is 2 m and the outer radius is 2.3 m. The pistons accelerate with a velocity of approximately 40 m/s and strike a wall of the sphere and subsequently strike the fluid in the vessel. The reference numeral 640 indicates a central shaft inserted in the center of the cavity to correspond to the jet deflector 12 (FIGS. 1A, 1B) or deflector 210 (FIG. 2).

Results of both CFD and FEA simulations have shown that jets emerging as a result of the cavity collapse can be divided into (i) a high speed central jet generated by the actual collapse at the axis of the cavity (e.g., a singular collapse point) and (ii) a blob of fluid, e.g., a mass of fluid dribbling into the injector's nozzle when the pressure pulse wavefront approaches the generator's outlet end. In the simulations performed, the blob is observed for all amplitudes of a pressure pulse and the speed of the blob is much slower than that of the high speed central jet. FIGS. 8a and 8b show examples of the velocity of the high speed jet and the liquid blob, respectively. As illustrated in FIG. 8a the central jet 720 can emerge at a speed of several kilometers per second whereas the blob 710 can emerge at tens of meters per second (FIG. 8b). The examples of the simulations of FIGS. 8a and 8b show that the velocity of the central jet 720 can be in a range from approximately 1500 m/s to approximately 2500 m/s while the velocity of the blob 710 can be in a range from approximately 50 m/s to approximately 75 m/s, which is only about 3% of the central jet's velocity.

Figure 9A:
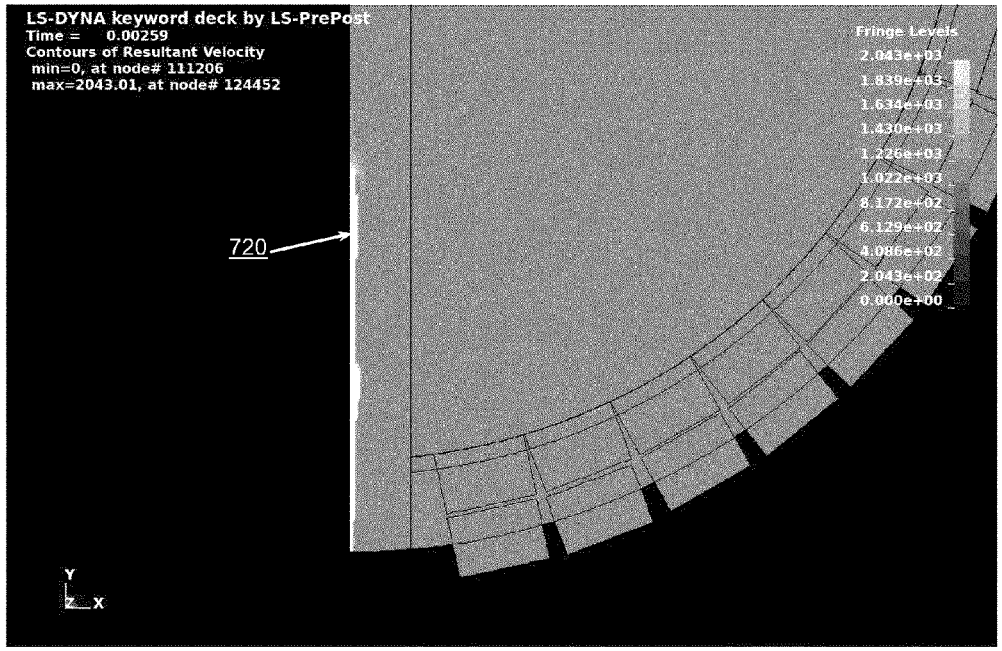
FIG. 9a is a partial cross-sectional view of a computational model of a plasma compression chamber illustrating an example of a central high speed jet velocity when a jet deflector is not present in a cavity.
Figure 9B:
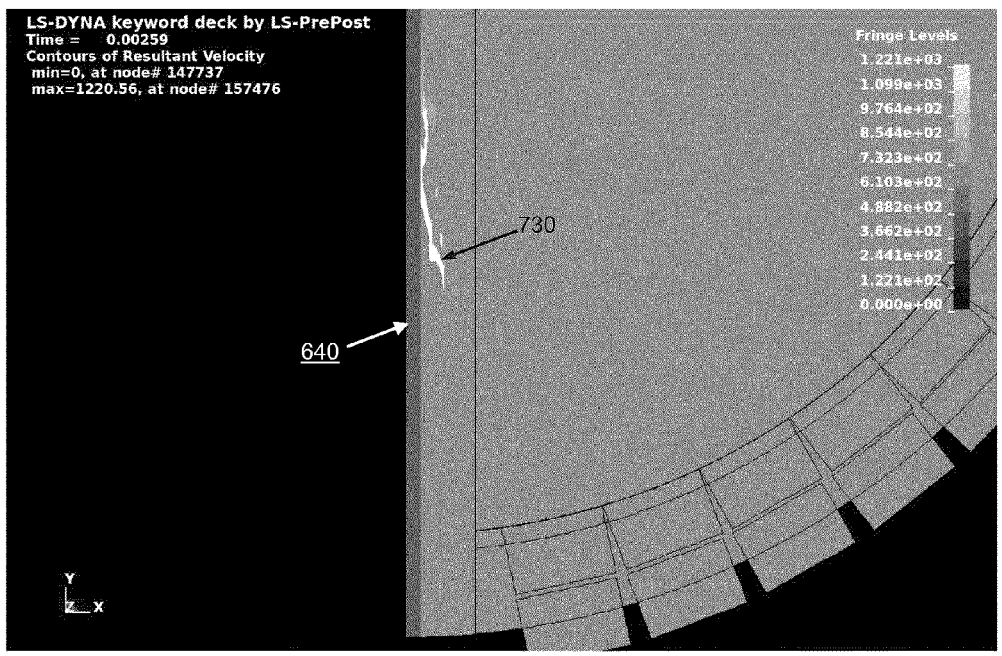
FIG. 9b is a partial cross-sectional view of a computational model of a plasma compression chamber illustrating an example of a velocity of emerging jets when a jet deflector is present in a cavity.

A comparison of the fluid jet with and without the central shaft 640 is shown in FIGS. 7 and 9. FIGS. 7a and 9a show formation of the high speed central jet, such as a thin filament of fluid 720 when a deflector (shaft 640) is not present in the cavity. FIG. 7a further shows formation of the blob 710 near the opening of the chamber. The jet 720 can be a high speed jet that flows along the axis of the cavity. In order to eliminate or reduce the central jet, a simulation was carried out with a shaft 640 inserted in the center of the cavity (see FIGS. 7b, 9b). FIGS. 7b and 9b show the plurality of dispersed jets 730 formed when the shaft 640 is inserted into the cavity. Simulations have shown that when the central shaft is present in the cavity, the formation of the central high speed jet can be avoided and jets 730 formed by the collapse of the cavity at the surface of the shaft 640 tend to be deflected to hit the main body of the fluid. Furthermore, according to the simulations, the size of the jets 730 formed when the shaft is present is approximately one-quarter the size of the jet 720 formed when no shaft is present. In the example shown in FIG. 7b, the presence of the shaft 640 did not completely eliminate the fluid blob 710, although it did reduced its size.

FIG. 9a illustrates a velocity of the jet formed when no central shaft 640 is present in the cavity while FIG. 9b illustrates a velocity of the jets formed when the central shaft 640 is inserted into the cavity. The simulations have shown that when the shaft is present in the cavity the velocity of the jets 730 can be reduced to approximately 60% of the velocity of the jet 720, when the shaft 640 is absent from the cavity.

A geometrical shield corresponding to the shield 240 of FIG. 2 has also been simulated. The simulation has shown that the use of the shield can reduce the likelihood and can prevent the blob of fluid from entering the generator. The vertical length of the shield depends of the size of the chamber and in the example simulated the vertical length was taken to be around 0.25 m. This is only for the purpose of illustration and different dimensions of the shield can be used in other implementations.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. A plasma compressing system, the system comprising:
a plasma generator configured to generate plasma and having a discharge outlet for discharging the generated plasma;
a plasma compression chamber having an outside wall defining an inner cavity of the chamber and having an opening, the inner cavity of the chamber being partially filled with a liquid medium, the discharge outlet of the plasma generator being in fluid communication with the inner cavity of the compression chamber via the opening, such that the generated plasma can be discharged into the plasma compression chamber;
a pressure wave generator comprising a plurality of pistons arranged around the chamber, the pistons being configured to generate a converging pressure wave into the liquid medium;
a cavity generating means for generating an elongated empty cavity into the liquid medium, the cavity having a first end and a second end, the first end being aligned at least partially with the discharge outlet of the plasma generator such that the plasma discharged by the plasma generator enters the elongated cavity, and wherein the converging pressure wave reaching a cavity interface collapses the cavity enveloping the plasma; and
a jet control device comprising: means for injecting a jet deflector material in communication with a jet deflector material source and having a discharge end directed at a jet formation location in the cavity, the means for injecting configured to inject the jet deflector material into the cavity such that a fluid jet formed at the jet formation location is disrupted or deflected away from the plasma generator.

2. The plasma compressing system of claim 1, wherein the jet deflector material is in a liquid state, the means for injecting is a liquid injector comprising a liquid conduit with an injection nozzle at the discharge end.

3. The plasma compressing system of claim 2, wherein the means for injecting further comprises a control valve for controlling the flow of the liquid jet deflector out of the nozzle.

4. The plasma compressing system of claim 2, wherein the injector further comprises pressurization means coupled to the conduit and configured to supply sufficient pressure to direct a continuous stream of the liquid jet deflector material to the jet formation location, the stream having a substantially uniform radius.

5. The plasma compressing system as claimed in claim 4 wherein the pressurization means is selected from a group consisting of a pump and a pressurized gas source.

6. The plasma compressing system as claimed in claim 1, wherein the jet deflector is in a solid state, the means for injecting is an extruder comprising a die and a ram configured to extrude the jet deflector material out of the extruder in the form of an elongated rod.

7. The plasma compressing system as claimed in claim 6 wherein the extruder is further configured to extrude the jet deflector material in the form of an elongated rod having a length that extends at least from the discharge end of the extruder to the jet formation location.

8. The plasma compressing system as claimed in claim 1 wherein the jet deflector is in a solid state in the form of discrete pellets, and the means for injecting is a pellet driver having a breach and a movable gate for controlling the injection of at least one solid state jet deflector pellet at the jet formation location.

9. The plasma compressing system as claimed in claim 8 wherein the pellet driver is selected from a group consisting of a rail gun and a compressed gas gun.

10. The plasma compressing system of claim 8, wherein each pellet has a face surface with a concave shape.

11. The plasma compressing system as claimed in claim 6 wherein the elongated solid rod has dimensions that cause the collapse of the cavity to occur at a surface of the elongated solid rod.

12. The plasma compressing system of claim 1 further comprising a shield disposed in vicinity of the opening of the plasma compression chamber, and having an annular configuration for inhibiting a blob of liquid medium from escaping the plasma compression chamber and entering the plasma generator.

13. The plasma compression device of claim 12, wherein the shield is a wall projecting downwardly into the inner cavity of the chamber surrounding the opening.

14. The plasma compression device of claim 12, wherein the shield is a lip shaped constriction formed at an edge of the opening and projecting radially toward a center of the cavity.

15. The plasma compressing system as claimed in claim 1 wherein the jet deflector material has the same composition as the liquid medium and the system further comprises a liquid medium collection tank in fluid communication with the chamber and a fluid conduit fluidly coupling the collection tank with the jet deflector material source.

16. The plasma compressing system as claimed in claim 8 further comprising a controller programmed to control a timing of the injection of the at least one solid state jet deflector pellet into the cavity such that the pellet is in proximity to the collapse point when the cavity collapses.

17. The plasma compressing system as claimed in claim 2 further comprising a controller programmed to control a timing of the injection of the continuous liquid stream of jet deflector material into the cavity such that the cavity collapses at the surface of the continuous liquid stream.

* * * * *